ADDER CIRCUIT

Filed Dec. 31, 1957 2 Sheets-Sheet 1

| X | Y | $S_h$ | $C_h$ | $C_i$ | S | $C_o$ |
|---|---|---|---|---|---|---|
| 0 | 0 | 0 | 0 | 0 | $0=S_h$ | $0=C_h$ |
| 0 | 1 | 1 | 0 | 0 | $1=S_h$ | $0=C_h$ |
| 1 | 0 | 1 | 0 | 0 | $1=S_h$ | $0=C_h$ |
| 1 | 1 | 0 | 1 | 0 | $0=S_h$ | $1=C_h$ |
| 0 | 0 | 0 | 0 | 1 | $1=\bar{S}_h$ | $0=C_h$ |
| 0 | 1 | 1 | 0 | 1 | $0=\bar{S}_h$ | $1=\bar{C}_h$ |
| 1 | 0 | 1 | 0 | 1 | $0=\bar{S}_h$ | $1=\bar{C}_h$ |
| 1 | 1 | 0 | 1 | 1 | $1=\bar{S}_h$ | $1=C_h$ |

INVENTOR.
BENNETT HOUSMAN
BY George Baron
ATTORNEY

United States Patent Office 2,962,216
Patented Nov. 29, 1960

2,962,216

ADDER CIRCUIT

Bennett Housman, Arlington, Va., assignor to International Business Machines Corporation, New York, N.Y., a corporation of New York Filed Dec. 31, 1957, Ser. No. 706,447

6 Claims. (Cl. 235—175)

This invention relates to adder circuits and more particularly to adder circuits employing low temperature components.

Materials which are known as superconductors are so termed because of the fact that, when cooled below particular temperatures in the vicinity of absolute zero, they undergo transitions whereby they become essentially perfect conductors, losing all measurable electrical resistance. The phenomenon of superconductivity is treated in detail in such texts as "Superconductivity" by D. Shoenberg, published in 1952 by the Cambridge University Press in London, England and "Superfluids" volume I, by Fritz London, published in 1950 by John Wiley and Sons, Inc., New York, N.Y. The present invention relates to that aspect of superconductivity referred to as the phenomenon of "trapped flux" or a "frozen-in" field. Such phenomenon is discussed in the aforementioned texts as well as in a paper by J. J. Budnick et al. entitled "Trapped Flux in Impure Superconductive Tin" appearing in the July 15, 1956, issue of the "Physical Review," volume 103, No. 2, pages 286–291 and in a copending U.S. application for a "Multistable Circuit" by James W. Crowe et al., Serial No. 622,902, filed on November 19, 1956, and assigned to the assignee of the instant application. The trapped flux phenomenon has been observed in superconductor materials under certain conditions when the latter go from their superconductive states to their normal resistive states and back again to their superconductive states. When as a result of lowering its temperature a superconductive substance passes from its normal state to its superconducting state in the presence of an externally applied magnetic field, it becomes a perfect diamagnetic and excludes the applied field entirely except in a thin surface layer. Presumably, during the course of transition from the normal to the superconducting state, multiple connected parts within the substance may develop which have the general form of closed superconducting regions surrounding cores of normal metal. Such cores of normal state will have magnetic flux running through them. The perfect conductivity of the enclosing superconducting regions makes it impossible for this flux to change. The specimen retains a small magnetic moment proportional to the amount of flux trapped in this fashion even after the externally applied field has been reduced to zero. A persistent current in the thin surface layer of the superconductor exists around these cores of normal state so as to maintain the trapped flux. Such cores of normal state are believed to be caused by impurities in the superconductor substance. The effect of such impurities can be attained by actual holes or perforations made in the superconductive substance.

The aforementioned Crowe et al. application employs holes in a superconductive surface as a means for trapping flux, such flux being trapped in a first hole to indicate the storage of a binary "1," and means are provided to cause the trapped flux to be removed from said first hole and appear in a second hole its appearance in said second hole representing the storage of a binary "0." By providing for each hole a drive winding that is capable of supplying a magnetic field that is sufficient to induce a circulating current in the superconductor which exceeds the critical current of the superconducting area between two holes, one may switch trapped flux from one hole to another hole. Such switching may be employed to create a flip-flop, as will be shown hereinafter, and such flip-flop will become a most useful component in a novel adder.

Consequently it is an object of the present invention to construct a novel adder employing superconductive elements.

A further object is to provide logic circuits utilizing superconductive elements, such logic circuits being particularly applicable to computers.

Yet another object is to provide logic circuits that are particularly adaptable to operation when subjected to temperatures close to absolute zero.

Other objects of the invention will be pointed out in the following description and claims and illustrated in the accompanying drawings which disclose, by way of example, the principle of the invention and the best mode which has been contemplated of applying that principle.

Figures 1, 2, 3, 4, 5, 6, 7:
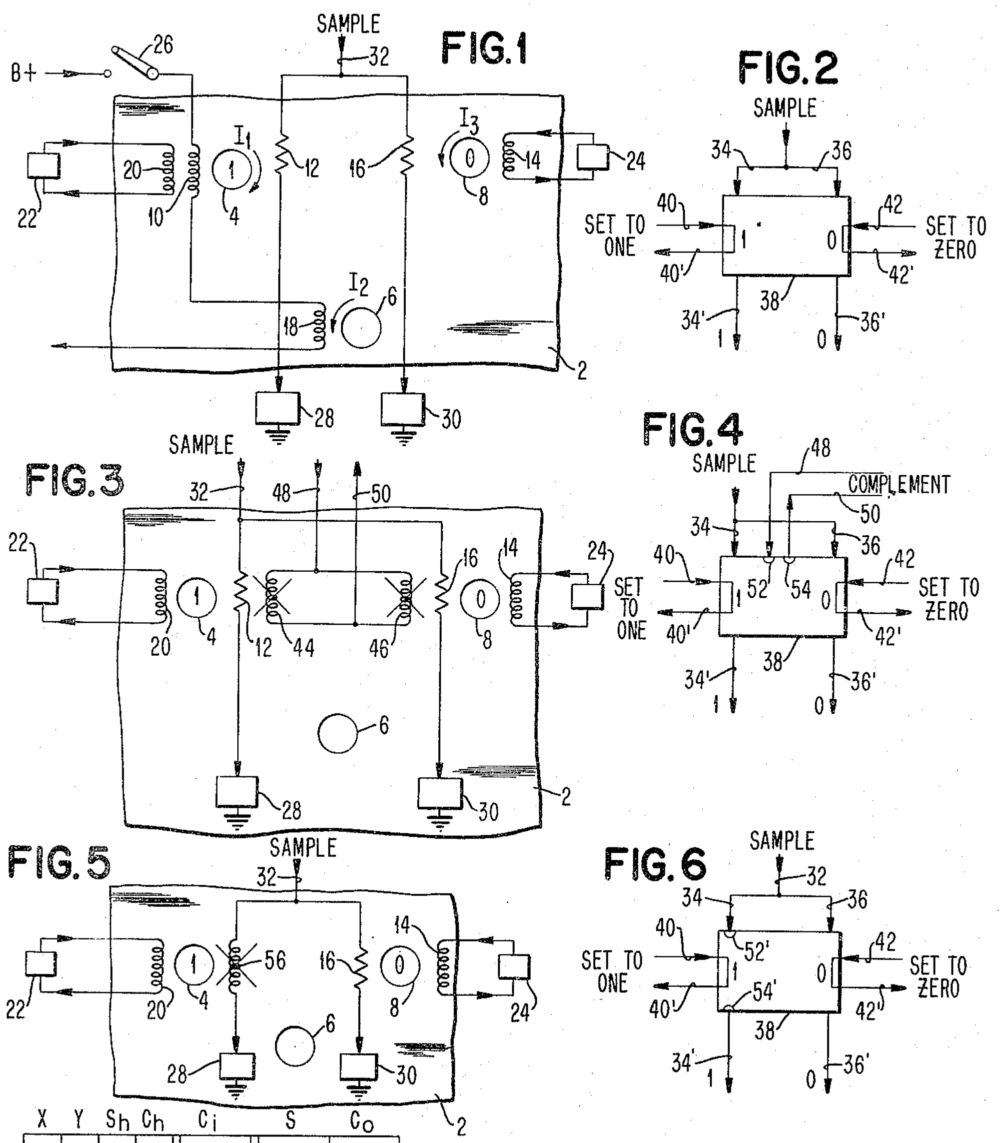
Fig. 1 is an electrical schematic showing of a low temperature flip-flop employed in the adder circuit of this invention and Fig. 2 is a block diagram representation of such flip-flop.
Fig. 3 is the low temperature flip-flop of Fig. 1 modified in a manner that permits successive input signals applied to the same input terminal to successively complement the flip-flop and Fig. 4 is its block diagram representation.
Fig. 5 is an electrical schematic showing of a low temperature flip-flop that always returns to its "0" state after being sensed or sampled and Fig. 6 is its block diagram representation.
Fig. 7 is a truth table setting forth the logic of a full adder.

If a magnetic field is first made to link two normal resistive areas in a thin superconducting film, and then the magnetomotive force supporting that field is removed, a residual magnetic field will remain linking the two areas so as to sustain a superconductive current flow in the thin film around the two areas. This remanent or "trapped" flux may be used as a memory unit, or the trapped flux can be made to switch back and forth between two such specified locations in response to input signals so as to act as a flip-flop. It has been experimentally observed that if a magnetic field has been trapped linking two holes, or two localized areas containing impurities in a superconducting film, by pulsing a drive coil placed over a third hole or localized area of impurity, the flux linking the first two holes can be made to transfer from one of them to the third hole. The result, after the termination of said driving pulse, is the trapping of flux linking the third hole with one of the original two.

The manner in which the flux is trapped is not clearly understood, as yet, but the manifestations of the phenomenon of trapped flux are sufficient and predictable so as to permit one to utilize such phenomenon in a workable device or system. One theory which has attempted to explain trapped flux is the following. Assume a superconductive film of a few microns thick having two holes therein. A "figure 8" coil is placed over the holes, and is adapted, when carrying current therethrough, to produce a magnetic field that attempts to link said holes, This attempt is initially unsuccessful due to an opposing magnetic field established by circulating currents induced in the superconductive film immediately around said holes, such induced circulating currents being the manner in which flux is prevented from penetrating a superconductive material as described in the above identified texts by Shoenberg and London. So long as the circulating currents flowing in the superconducting film between said holes are less than the critical current capacity of said film, the applied magnetic field is prevented from linking said holes by the opposing magnetic field produced by said circulating currents. However, when the circulating currents exceed the critical current of the superconducting film between the holes, the area between the holes will become resistive, the circulating currents will be dissipated due to the resistance, there will be a minute opposing magnetic field, and the applied field will link the two holes. The heat generated by the transition from the superconductive to the normal resistive state and by the circulating currents flowing through the resistive area for a short time will raise the temperature of the area between the holes to a temperature above the critical temperature of the superconducting film so that the latter will remain in the normal resistive state for a short period of time. If the applied current is maintained during that period, the produced magnetic field will remain linking the two holes. After the generated heat is dissipated by the liquid helium surrounding the superconductor and its associated elements, and the film returns to its superconductive state if the applied current is removed, the magnetic field maintained by applied current will attempt to collapse. However, the attempted collapse of the magnetic field will induce circulating currents around the two holes which will maintain the field, thus "trapping" the field linking the two holes.

Turning to Fig. 1, there is shown a thin metallic film 2 which becomes superconductive when immersed in a bath of liquid helium. Holes 4, 6 and 8 are cut out or masked out of film 2. Coupled to hole 4 is a flat spiral coil 10 which normally is wound concentric to such hole 4 and is placed physically directly above or below it. The drawing shows the spiral core 10 to be displaced laterally of the hole 4, such being done for the purpose of simplifying the showing of the invention. A wire 12 is zig-zagged across hole 4, such wire 12 being a sense wire and is placed over or under the hole 4. In a similar manner, flat spiral coil 14 and zig-zagged wire 16 are disposed about hole 8 in the manner in which coil 10 and wire 12 are disposed about hole 4.

In series with coil 10 is another coil 18, such coil 18 being wound concentric to hole 6 and located either above or below it. Coupled to hole 4 is set coil 20 which is connected to a suitable source 22 of current for applying a current pulse therethrough to transfer flux to hole 4, whereas coil 14 is also connected to a suitable source of current 24 so as to enable coil 14 to be pulsed to transfer flux to hole 8. A switch 26 may be closed at will so as to permit the application of current through coils 10 and 18. Connected to zig-zagged wire 12 is a load device 28 and a corresponding load device 30 is connected to wire 16. Sampling pulses appear at the input terminal 32, and which branch such pulses take down the parallel paths comprising wire 12, load 28 and wire 16, load 30, respectively, will be determined by whether hole 4 or hole 8 has flux trapped therein. Loads 28 and 30 must provide superconductive paths to ground so that only the resistive states of sense wires 12 and 16 will determine which path the sampling pulse takes.

In describing the operation of the flip-flop illustrated in Fig. 1, it is noted that all the coils 10, 14, 18 and 20 are hard superconductors whereas the sense wires 12 and 16 are soft superconductors. As defined for purposes of practicing the present invention, a hard superconductor is one which will remain in the superconducting state when subjected to magnetic fields of the magnitude normally encountered in the device in which such superconductor is employed, whereas a soft superconductor is one which will become resistive when subjected to those same magnetic fields.

The entire device of Fig. 1 is immersed in a bath of liquid helium, though the immersion of the current sources 22, 24 and B+ supply is optional, so that film 2 and all the coils and zig-zag wires are in the superconductive state. Coils 10 and 18 are wound in a manner that they will establish a magnetic field which links them when switch 26 is closed and current is passed through them. This magnetic field links holes 4 and 6 in the manner heretofore described. When switch 26 is opened, the magnetomotive force supporting the magnetic flux is removed, flux will be trapped, linking the two holes 4 and 6. The function of coils 10 and 18 is to initially trap flux between holes 4 and 6 so that the low temperature flip-flop may be started. Thereafter, switch 26 is opened and flux is made to switch from hole 4 to hole 8, with hole 6 acting as a pivot point. The application of a current pulse of sufficient magnitude to coil 14 from current source 24 will cause the film 2 between holes 4 and 8 to go normal. As soon as a normal path is established between holes 4 and 8, the closed lines of magnetic flux linking holes 4 and 6 tend to travel through the normal regions established between holes 4 and 8. When the latter change takes place, complete lines of magnetic flux now link holes 6 and 8, the flux in hole 4 disappears, the normal regions between holes 4 and 8 reverting to their superconductive state in the wake of the magnetic lines of flux as the latter progress toward hole 8. Flux now links holes 6 and 8, and by definition, the flip-flop has switched from its "1" state to its "0" state. Subsequently the application of a sufficient current pulse through winding 20 will cause the flux linking holes 6 and 8 to pivot about hole 6 and link holes 4 and 6 when such current pulse has terminated.

Zig-zag elements 12 and 16 are soft superconductors that are used as sensing elements for determining the state of the low temperature flip-flop just described. Each soft superconductor will be driven resistive by the trapped flux threading the hole associated with it; in other words, upon the state of the flip-flop. When a sample pulse is applied at input lead 32, such pulse will pass through soft superconductor 16 to actuate load 30 when flux is threading holes 4 and 6, and it will pass through soft superconductor 12 to actuate load 28 when flux is threading holes 6 and 8. With loads on the output end of the soft superconductors providing at least one superconducting path to ground, the sample pulse appearing at lead 32 will appear on one of the outputs with no loss of power. The zig-zag configuration of the soft superconductors 12 and 16 is for the purpose of preventing, by creating cancelling magnetic fields, the magnetic field generated by the sample current through such soft superconductors from disturbing the state of the flip-flop. Of course the sampling current is chosen so that it does not exceed the limit of self-current that the soft superconductor can tolerate before being driven resistive. A "1" would represent no trapped flux in hole 8 and a "0" would indicate no trapped flux in hole 4.

One theory for explaining the transfer of trapped flux is as follows: Assume initially that flux is trapped through holes 4 and 6. Such flux is maintained by circulating currents $I_1$ and $I_2$ flowing in the direction of the arrows shown in Fig. 1. Through hole 8, one attempts to force a magnetic field in the same direction as the field in hole 4. Since there can be no net flux change through a superconducting film, circulating current $I_3$ will be generated to keep the net flux linkage through hole 8 to zero. The predetermined distance between holes 4 and 8 can carry a finite amount of current, so when $I_1$ plus $I_3$ exceeds this amount, the area between holes 4 and 8 will go into its normal state. Due to this normal state, the current $I_1$ can no longer flow around hole 4 and thus the flux linking hole 4 no longer has a current to maintain it. The flux linking hole 4 cannot collapse since the area of the film 2 between holes 4 and 6 is in the superconducting state. However, there is a current flowing in coil 14 which will maintain a flux and the area between holes 4 and 8 is in its normal resistive state. The flux linking hole 4 will therefore transfer from hole 4 to hole 8. The net flux through hole 6 during this whole process must remain constant. Thus the field through hole 6, now linked through hole 8, remains constant. The energy taken from the driver 24 was just that amount to move the trapped flux from one hole to the other, plus that energy dissipated in eddy currents.

Fig. 2 is a block diagram representation of the low temperature flip-flop of Fig. 1. The connections to the soft superconductors 12 and 16 are indicated by the vertical lines 34, 34' and 36, 36' respectively, entering and leaving the block near the sides of block 38. The connections to the set coils 20 and 14 are represented by the horizontal lines 40, 40' and 42, 42', respectively, entering and leaving the sides of block 38. It is noted that the representation in Fig. 2 of coils 10 and 18 has been omitted, since such coils are used just to set the flip-flop initially. Where it is desired, there may be more than one sense winding or soft superconductor 12 or 16 associated with a hole if the flip-flop circuit requires more than one output signal to indicate the state of the flip-flop or the process of addition requires such plural sense windings. Similarly, there may be more than one set coil 20 or 14 associated with a hole if desired. A line carrying a sampling pulse passes such pulse through a zig-zag superconductive element such as 12 or 16 so that the state of the flip-flop is not changed by the sampling pulse. But if such sampling pulse is made to pass through a coiled hard superconductor such as coils 10, 14, 18 or 20, then the state of the flip-flop may change if the sampling pulse is of the proper polarity.

Fig. 3 is a circuit diagram of a complementing form of the flip-flop of Fig. 1. A complementing flip-flop is one which changes the state of a flip-flop whenever an input pulse appears at its input terminal. In Fig. 3, as well as in Fig. 5, the coils 10 and 18 for initially trapping flux have been omitted in order to simplify the representation of those embodiments of the invention shown in such figures. Coils 44 and 46 have an X drawn across them to indicate that they are soft superconductors and they provide parallel paths for the complementing input pulse appearing at input lead 48 and exiting through output lead 50. Under steady state conditions of the flip-flop, one of the coils 44 or 46 will be resistive due to presence of trapped flux in its associated hole 4 or 8. When an input pulse appears on lead 48, almost all the current will flow through that coil 44 or 46 which is superconductive. After the flux has been trapped initially by momentarily closing switch 26, the conditions of the two coils 44 and 46 are reversed by such complementing pulses. Subsequent pulses at input lead 48 will complement or cause reversal of state of the flip-flop in the manner described hereinabove.

Fig. 4 is similar to Fig. 2, save that the lines 48 and 50 that are connected to soft superconductors 44 and 46 are indicated by arcs 52 and 54 where such lines 48 and 50 enter and leave block 38 in order to represent a complementing flip-flop.

Fig. 5 is that embodiment of the flip-flop wherein the latter will return to its "1" state after each sampling. This return to "1" after sensing is accomplished by replacing the zig-zag soft superconductor 12 over hole 4 of Figs. 1 and 3 with a soft superconducting coil 56. Thus, when the low temperature flip-flop is in its "1" state, i.e., flux linking holes 4 and 6, the sample pulse will be passed by the soft zig-zag element 16 which is effectively shorting out the now resistive element 56. Such current passing through zig-zag element 16 will not disturb the state of the flip-flop. However, when the flip-flop is in its "0" state, i.e., flux linking holes 6 and 8, the majority of the sampling current will pass through the soft superconducting coil 56 and thus will reset the flip-flop to its "1" state. The inductance of the soft superconductor coil 56 is small compared to the resistance of soft superconductor 16 to assure such reset-to-one state during continuous sensing, otherwise the L/R time constant could be too long and would prevent the coil 56 from carrying the full driving pulse during the time interval of said pulse.

The block representation in Fig. 6 of the flip-flop of Fig. 5 is similar to that of Fig. 4 save that arcs 52' and 54' show respectively the points of entry and departure of the sampling pulse in block 38 that are connected to soft superconductor 56. By interchanging the soft superconductor coil 56 and soft superconductor zig-zag element 16, the flip-flop of Fig. 5 can be made to end up in its "1" state after every sampling or sensing operation. Likewise, if the soft superconductive zig-zag element 16 over hole 8 in Fig. 5 is also replaced with a soft superconducting coil, the flip-flop could be complemented when it was sampled.

Fig. 7 represents the truth table of a full adder wherein X may represent the addend and Y the augend, $S_h$ the half adder sum and $C_h$ the half adder carry. The notation $C_i$ represents the incoming carry from a previous adder stage, $C_o$ represents the output carry of a full adder, and S the sum of a full adder. The bar over a letter indicates the absence or the "not" condition of the letter, i.e., $\bar{S}_h$ indicates the absence of the half adder sum. In Boolean algebra, the expression for the sum (S) and the output carry ($C_o$) of a full adder in terms of the addend (X), the augend (Y), and the input carry ($C_i$) are as follows:

$$S=XYC_i+X\bar{Y}\bar{C}+\bar{X}Y\bar{C}+\bar{X}\bar{Y}C_i$$
$$C_o=XY\bar{C}_i+X\bar{Y}C_i+\bar{X}YC_i+XYC_i$$

The four possible combinations of S and $C_o$ are:

$$SC_o=XYC_i$$
$$\bar{S}C_o=XY\bar{C}_i+\bar{X}YC_i+X\bar{Y}C_i$$
$$S\bar{C}_o=X\bar{Y}\bar{C}_i+\bar{X}Y\bar{C}_i+\bar{X}\bar{Y}C_i$$
$$\bar{S}\bar{C}_o=\bar{X}\bar{Y}\bar{C}_i$$

Figure 8:
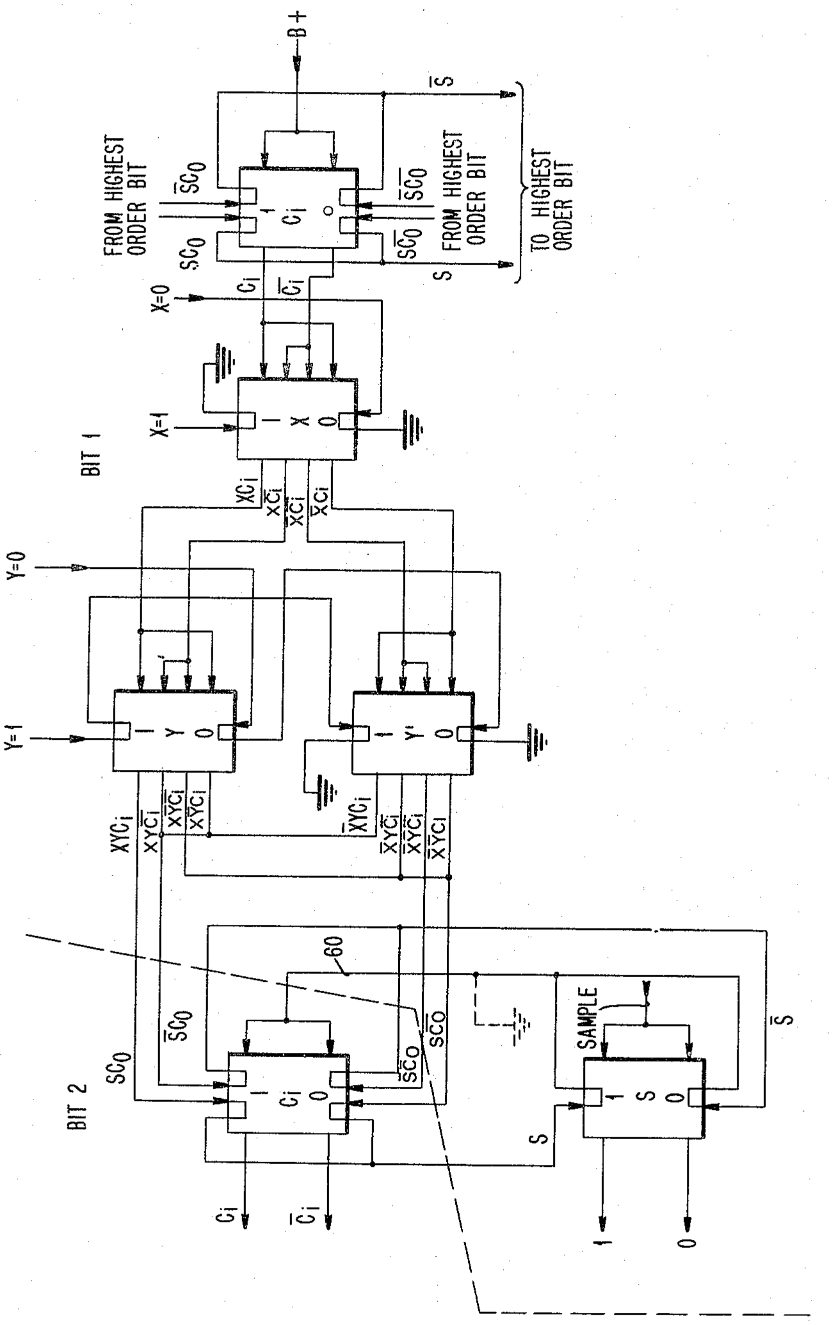
Fig. 8 is a block diagram representation of a low temperature adder forming the instant invention, such block diagram incorporating flip-flops of the types shown in the hereinabove Figs. 1, 3 and 5.

Fig. 8 depicts a low temperature full adder that is able to perform the logical functions defined above so that binary addition can be carried out. The full adder of Fig. 8 is represented in the symbology of Figs. 2, 4 and 6, particularly Fig. 2. Since the very first X and Y bits of a register can have at the most only two bits, and since a full adder should be capable of operating on three bits (X and Y inputs plus a possible carry input from a previous stage) in order to produce two outputs, namely, a sum, carry, or both, the "end-around" carry from the highest order bit is employed to provide a possible carry to be added to the first bits X and Y.

It is noted that in Figures 1, 3, and 5 of the drawings that when the superconductive flip-flop of this invention is set to its "1" state, namely, trapped flux linking holes 4 and 6, the sampling pulse will appear at load 30. Similarly when the superconductive flip-flop is in its "0" state, i.e., flux linking holes 6 and 8, the sampling pulse will appear at lead 28. However the block diagrams of Figures 2, 4, 6 and 8 are represented with the output load on the same side of a block 38 as the binary state of the flip-flop. Such representation is for ease of understanding the logic and is not meant to conform to the physical structure of the superconductive flip-flops shown in Figs. 1, 3 and 5.

The operation of the instant adder as shown in Fig. 8 can be understood by following the flow of information from right to left, starting at the $C_i$ flip-flop immediately to the right of the flip-flop that will store the first digit of an X register. Each output and input line is labeled according to its logical significance. The X (addend)

and Y (augend) inputs are read into the full adder by actuating either coil 14 or coil 20 of Fig. 1, depending upon whether the digit read-in is a "0" or a "1." The input to the $C_1$ flip-flop of bit 1 can be connected, as shown, to the B+ of a D.C. source of supply which supplies the sensing or sampling current for each flip-flop of the adder. Thus, if the addend X is a "1," and the carry $C_1$ is a "1," then the sampling current from the B+ supply will flow through a zig-zag line, such as 12 or 16, in the $C_1$ and X flip-flops, and will appear on the $XC_1$ output line. The $XC_1$ line carries sampling current to the Y flip-flop, or the augend bit, and if the augend is a "1," then the $XYC_1$ line will be the carrier of sampling current. The current carried by the $XYC_1$ line will travel through coils, such as coils 14 and 16 of Fig. 1, of the "carry" flip-flop $C_1$ of the second stage of the adder, then through similar coils in the "sum" flip-flop S of the first stage of the adder and back again through the same "carry" flip-flop $C_1$ of the second stage of the adder along sampling line 60. The sampling D.C. level along line $XYC_1$ will switch the states of flip-flops $C_1$ and $S_1$ if they happen to be in their "0" states at the time of sampling. After such flip-flops have settled down, the same sampling pulse will pass through line 60 and sense the presence of a carry in the $C_1$ flip-flop.

It is noted that the use of a D.C. level for the sensing current permits addition to be carried on all the time. This results in the production of transient pulses when either the X or Y register is being changed. However, these transients are almost immediately replaced by the stable states of the flip-flops storing the new sums and carries. If the X and Y registers are modified prior to the application of a sensing current, then a long pulse can be used instead of a D.C. level for carrying out the addition. The addition process is then initiated by such long pulse, and the modification of the X and Y registers takes place without affecting the sum register. After addition is completed, the sum register is sampled to read out its contents to another register or to an accumulator, such read out being inherently non-destructive in that the sampling current will pass through zig-zag elements in the "sum" flip-flops and be ineffective to switch such flip-flops. In order to carry out the additive process, each X and Y flip-flop has two sampling circuits per flip-flop, whereas the "sum" and "carry" flip-flops have only one sampling circuit per flip-flop.

The employment of a low temperature flip-flop in a novel manner permits an adder to be constructed that is extremely small in size (see the article entitled "Trapped-Flux Superconducting Memory" by J. W. Crowe appearing in vol. 1, No. 4, of the October 1957 issue of the "IBM Journal of Research and Development," pages 295–303 for relative dimensions of superconductive film 2, apertures 4, 6 and 8, coils 10, 14, 18 and 20 and zig-zag elements 12 and 16) and is very rapid in that a single pulse or a single D.C. level completes the addition process. Moreover, at any time, there will be one, and only one, superconducting path through the adder network.

I claim:

1. A binary adder employing a first flip-flop for storing the "augend," a second flip-flop for storing the "addend," each of said flip-flops comprising a superconductive film having at least two apertures therein, means for trapping magnetic lines of flux in one aperture to indicate the "1" state of storage and further means for tripping flux in the other aperture to indicate the "0" storage state, a superconductive sensing element coupled to each aperture whereby such sensing element becomes normal resistive should flux be trapped in its coupled aperture, means for simultaneously sending a direct current through said sensing elements of said "augend" and "addend"

flip-flops so that such direct current will traverse a single superconductive path through their respective superconducting sensing elements that are not rendered normal resistive by trapped flux, such single superconductive path being representative of the binary "sum" of the "augend" and "addend" binary bits, and means for employing said single superconductive path to trap magnetic flux in either of two apertures in said "sum" flip-flop.

2. A binary adder employing a first flip-flop for storing the input "carry" of a previous stage, a second flip-flop for storing the "augend" bit, third and fourth flip-flops wherein each stores the addend bit, a fifth flip-flop for storing therein the "sum" of said input "carry," "augend" and "addend," and a sixth flip-flop for storing the output "carry" of the next stage, each of said flip-flops comprising a superconductive film having at least two apertures therein, means for trapping magnetic lines of flux in one aperture to indicate the "1" state of storage and further means for trapping flux in the other aperture to indicate the "0" storage state, a superconducting sensing element coupled to each aperture whereby such sensing element becomes normal resistive should flux be trapped in its coupled aperture, means for simultaneously sending a direct current through said sensing elements of said first, second, third and fourth flip-flops so that such direct current will traverse a single superconductive path through their respective superconducting sensing elements that are not rendered normal resistive by trapped flux, such single conductive path being representative of the binary "sum" and output "carry," and means for employing said single superconductive path to trap magnetic flux in either of two apertures of said "sum" flip-flop and output "carry" flop-flop.

3. A binary adder as defined in claim 2 wherein said single superconductive path is employed to sense the state of said output "carry" flip-flop as well as to trap flux therein.

4. A flip-flop employing superconductive elements comprising a superconductive film having first and second inhomogeneous localized areas therein, a first magnetic field producing means for establishing magnetic lines of flux linking said first and second localized areas, such flux linkage being representative of the storage of a binary "1," a third inhomogeneous localized area in said superconducting film, a second magnetic field producing means for establishing magnetic lines of flux linking said first area with said third area and wherein such flux linkage is representative of the storage of a binary "0," a sampling circuit for sensing the state of such flip-flop comprising a parallel electrical path, one branch of said parallel path including a coiled soft superconductor coupled to said second localized area and adapted to create a critical magnetic field about itself when carrying sampling current pulses through there so as to influence the superconductive film about said second localized area, the second branch of said parallel path including a zig-zagged soft superconductor coupled to said third localized area and adapted not to create a critical magnetc field about itself when carrying sampling current therethrough.

5. A flip-flop as defined in claim 4 wherein the inductance of said soft coiled superconductor exceeds the impedance of said zig-zagged soft superconductor.

6. A flip-flop as defined in claim 4 wherein said localized areas are apertures in the superconductive film.

References Cited in the file of this patent

UNITED STATES PATENTS

| | | |
|---|---|---|
| 2,781,968 | Chenus | Feb. 19, 1957 |
| 2,785,854 | Chaimowicz | Mar. 19, 1957 |
| 2,802,953 | Arsenault et al. | Aug. 13, 1957 |
| 2,832,897 | Buck | Apr. 29, 1958 |